Aug. 19, 1958  E. V. HAVENS ET AL  2,848,269
LOADING MECHANISM

Filed June 6, 1956  2 Sheets-Sheet 1

INVENTORS.
EUGENE V. HAVENS
ERNEST H. JOHNSON
BY
ATTORNEY

United States Patent Office 2,848,269
Patented Aug. 19, 1958

2,848,269

LOADING MECHANISM

Eugene V. Havens and Ernest H. Johnson, Bridgeport, Conn., assignors to The Bullard Company, a corporation of Connecticut Application June 6, 1956, Serial No. 589,711

6 Claims. (Cl. 294—89)

The present invention relates to loading devices, and particularly to a new and improved loading device for hollow workpieces adapted to be loaded into a lathe and the like.

The principal object of the present invention is to provide a flexible loading device capable of cooperation with the interior surface of a hollow workpiece and to effectively grip the same without affecting the outer surface thereof.

Other objects of the invention include the provsion of a loading device embodying a pair of cylinder-like elements adapted to assume two locations, one of which effects gripping of the work, and the other of which permits ingress and egress to hollow work bodies; the provision of such a loading device in which the cylinder-like bodies are provided with surface contours adapted to cooperate with each other and to effectively grip the inside surface of hollow work bodies; and the provision of such a loading device in which a plurality of pairs of such cylinder-like members are employed having different diameters.

The above, as well as other objects and novel features of the invention will become evident from the following specification and the accompanying drawings, in which.

Figure 2:
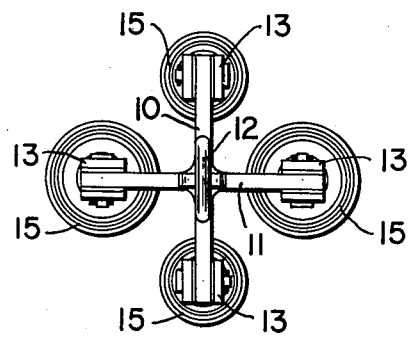
Fig. 2 is a top plan view of the loading device shown in Fig. 1.
Figure 1:
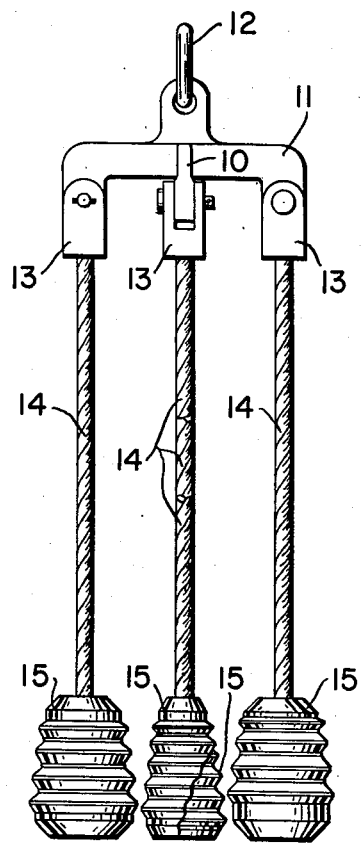
Figure 1 is an elevational view, partly in section, of a loading device embodying the principles of the invention.

Referring to the drawings, a pair of links 10 and 11 are rigidly connected together at their medial points forming a cross-like structure. A pivotal eye construction 12 is fixed to the cross-like structure at the point of intersection of the links. The construction and arrangement are such that eye-like element 12 can be connected to the hook of a hoisting crane and the cross-like member is adapted to be pivoted about the longitudinal axis of either of the links.

At the extremities of each of the links 10 and 11, pivotal connectors 13 are located. Each of the pivotal connectors 13 is fixed to the one end of a flexible cord 14, to the opposite end of each of which is rigidly connected a cylinder-like body element 15. The outer surface of the cylinder-like members 15 is corrugated and the members are arranged in diametrically disposed pairs having large and small diameters for a purpose to be described later.

Figure 3:
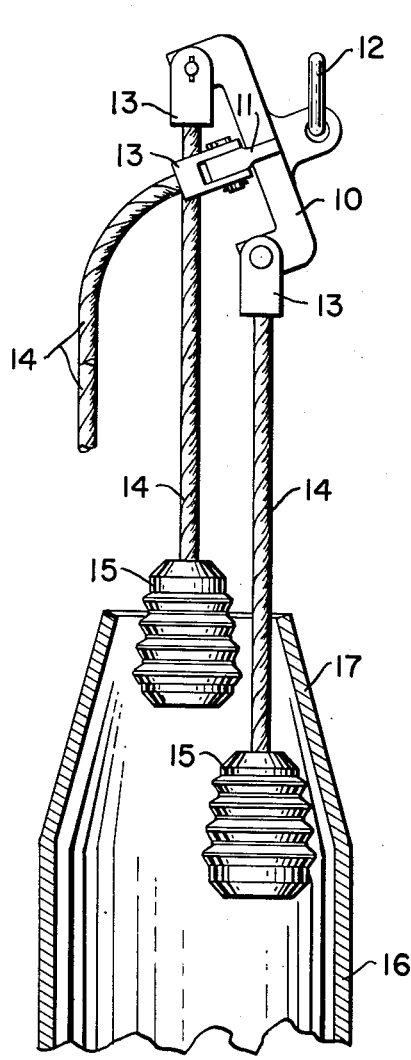
Fig. 3 is an elevational view showing the apparatus in position for facilitating egress and ingress to a hollow work body.
Figure 4:
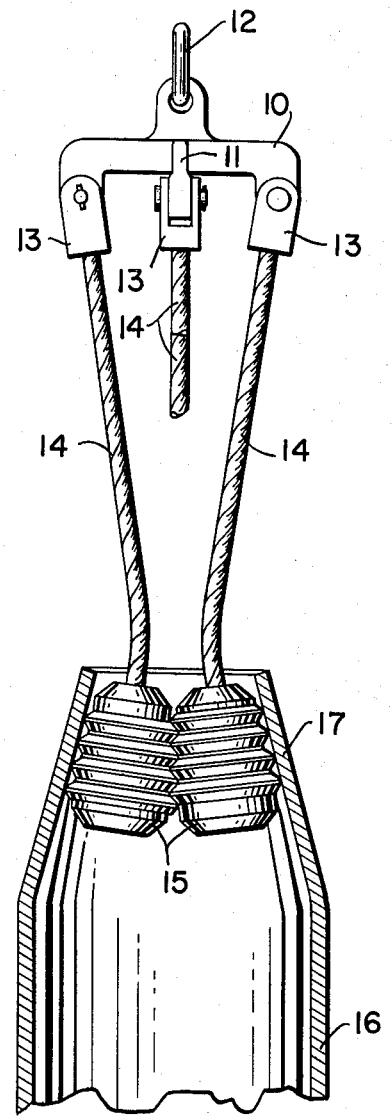
Fig. 4 is an elevational view showing the apparatus in condition for effectively gripping a hollow work body.

Referring to Figs. 3 and 4, the loading device is designed for use with hollow work bodies, and finds application particularly in the loading and unloading of artillery shells in a lathe. Artillery shells include a hollow cylindrical portion 16 at the upper end of which a nosed portion 17 is provided. These shell bodies are forged from billets and subsequently require rough and finish machining on the outer surfaces thereof. The upper end of the nosed section 17 is usually cut off to length thereby providing a larger entrance and exit diameter to the interior of the shell than was originally provided prior to the cutting off operation. Accordingly, the smaller diameter cylinder-like elements 15 are adapted to be used for loading the shell into the lathe when the entrance to the interior of the shell is of a smaller diameter than it is after machining; and, the larger diameter cylinder-like members 15 are employed for removing the machined artillery shell from the lathe.

In use, the cross-like structure including the links 10 and 11 is turned about the longitudinal axis of the link 11 so that the smaller members 15 assume the elevation shown in Fig. 3. This permits the two elements 15 of smaller diameter to pass into the interior of the artillery shell, at which time the link 11 is permitted to assume a position wherein it as well as link 10 lie in a horizontal plane as shown in Fig. 4. Accordingly, the cylinder-like elements 15 assume the elevation shown in Fig. 4 and the corrugations on the surfaces thereof interlock with each other as well as effectively grip the interior surface of the nosed portion 17 of the artillery shell. When the piece has been hoisted to the lathe, it is only necessary to pivot the cross-like member including the links 10 and 11 about the longitudinal axis of the link supporting the un-used conical shaped member 15 whereupon the members 15 within the artillery shell again assume the position shown in Fig. 3, and can be withdrawn therefrom.

Although the various features of the improved loading device have been shown and described in detail to fully disclose one embodiment of the invention, it will be evident that numerous changes may be made in such details, and certain features may be used without others without departing from the principles of the invention.

What is claimed is:

1. A work-loading device for use with open-ended hollow bodies comprising in combination, a link; a pivotal support for said link and connected to said link at the middle of its length; flexible lines of the same length attached to each end of said link; and cylinder-like bodies attached to the free end of each line, each having a diameter greater than half that within the workpiece through which the cylinder-like bodies are adapted to pass during a work-loading operation.

2. A work-loading device for use with open-ended hollow bodies comprising in combination, a link; a pivotal support for said link and connected to said link at the middle of its length; flexible lines of the same length attached to each end of said link; cylinder-like bodies attached to the free end of each line, each having a diameter greater than half that within the workpiece through which the cylinder-like bodies are adapted to pass during a work-loading operation; and corrugations on the outer surface of said cylinder-like bodies adapted to cooperate with each other and to effectively grip the interior surface of a workpiece.

3. A work-loading device for use with open-ended hollow bodies comprising in combination, a pair of links integrally attached to each other and forming a cross; a pivotal support for said links and connected thereto at the intersection of said links; flexible lines of the same length attached to each end of said links; and cylinder-like bodies attached to the free end of each line, each having a diameter greater than half that within the workpiece through which the cylinder-like bodies are adapted to pass during a work-loading and work-unloading operation.

4. A work-loading device for use with open-ended hollow bodies comprising in combination, a pair of links rigidly attached to each other at the centers thereof; a pivotal support for said links and connected thereto at the intersection of said links; flexible lines of the same length attached to each end of said links; cylinder-like bodies attached to the free end of each line, each having a diameter greater than half that within the workpiece through which the cylinder-like bodies are adapted to pass during a work-loading and work-unloading operation; and corrugations on the surfaces of each of said cylinder-like bodies adapted to cooperate with each other and the interior surface of a hollow work body.

5. A work-loading device for use with open-ended hollow bodies comprising in combination, a link; a pivotal support for said link and connected to said link at the middle of its length; flexible lines of the same length attached to each end of said link; and cylinder-like bodies attached to the free end of each line, each having a diameter greater than half that within the workpiece through which the cylinder-like bodies are adapted to pass during a work-loading operation, the distance from the pivotal support to each end of said link being such that movement of said link from a horizontal plane to a substantially vertical plane will locate said cylinder-like bodies in spaced elevational position.

6. A work-loading device for use with open-ended hollow bodies comprising in combination, a pair of links integrally attached to each other and forming a cross; a pivotal support for said links and connected thereto at the intersection of said links; flexible lines of the same length attached to each end of said links; and cylinder-like bodies attached to the free end of each line, each having a diameter greater than half that within the workpiece through which the cylinder-like bodies are adapted to pass during a work-loading and work-unloading operation, the distance from the pivotal support to each end of each of said links being such that movement of each link from a horizontal plane to a substantially vertical plane will locate the corresponding cylinder-like bodies in spaced elevational position.

No references cited.